United States Patent [19]

Heubach et al.

[11] Patent Number: 4,536,385
[45] Date of Patent: Aug. 20, 1985

[54] METHOD AND APPARATUS FOR THE PRODUCTION OF INDUSTRIAL LEAD OXIDE

[75] Inventors: Rainer Heubach, Goslar; Reinhard Marx, Bad Harzburg; Peter Kunz, Goslar; Dieter Hauke, Vienenburg, all of Fed. Rep. of Germany

[73] Assignee: Goslarer Farbenwerke Dr. Hans Heubach GmbH & Co. KG, Langelsheim, Fed. Rep. of Germany

[21] Appl. No.: 467,090

[22] Filed: Feb. 16, 1983

Related U.S. Application Data

[63] Continuation of Ser. No. 258,013, Apr. 27, 1981, abandoned.

[30] Foreign Application Priority Data

May 2, 1980 [DE] Fed. Rep. of Germany ....... 3016984

[51] Int. Cl.$^3$ ............................................. C21C 7/00
[52] U.S. Cl. ...................................... 423/621; 422/49; 422/109; 422/150
[58] Field of Search ......................................... 423/621

[56] References Cited

U.S. PATENT DOCUMENTS

| | | | |
|---|---|---|---|
| 988,963 | 4/1911 | Barton | 423/621 |
| 1,156,079 | 10/1915 | Holley | 423/621 |
| 1,779,003 | 10/1930 | Knapp et al. | 423/621 |
| 2,112,189 | 3/1938 | Beyersdorfer | 423/621 |
| 3,322,496 | 5/1967 | Vahrenkamp et al. | 423/621 |
| 3,791,813 | 2/1974 | Ramachandran et al. | 75/60 |

FOREIGN PATENT DOCUMENTS

| | | | |
|---|---|---|---|
| 328044 | 6/1943 | Fed. Rep. of Germany | 423/621 |
| 1467347 | 5/1971 | Fed. Rep. of Germany | 423/621 |
| 1209179 | 12/1971 | Fed. Rep. of Germany | 423/621 |
| 391612 | 7/1951 | France | 423/621 |
| 400270 | 6/1952 | France | 423/621 |
| 1414313 | 9/1967 | France | 423/621 |
| 1364391 | 9/1973 | United Kingdom | 423/621 |

Primary Examiner—John Doll
Assistant Examiner—Wayne A. Langel
Attorney, Agent, or Firm—Browdy and Neimark

[57] ABSTRACT

A method and an apparatus for the production of industrial lead oxide involving mixing molten lead and air in a reactor. A particularly advantageous, having a desired particle size can be obtained with a PbO content of considerably more than 99%. The lead flow is introduced at a constant and even rate and the air flow is altered very slightly in order to maintain the pre-determined reaction temperature having fluctuations of a maximum of ±5° C.

The constant and steady infeed of the lead flow is achieved by using an apparatus according to the invention. The apparatus, which is situated above the reactor, includes a supply vessel charged with molten lead from a melt container, the supply vessel having an exchangeable nozzle which is provided with a control-operated cleaning pin. The nozzle extends into a reaction space and the supply vessel is connected to the melt container via a feed line and an overflow. The nozzle can also be of a known spray nozzle type which is fed with heated compressed air via a line running through the said melt container.

4 Claims, 2 Drawing Figures

METHOD AND APPARATUS FOR THE PRODUCTION OF INDUSTRIAL LEAD OXIDE

This is a continuation of application Ser. No. 258,013 filed Apr. 27, 1981, abandoned.

BACKGROUND OF THE INVENTION

The invention relates to a method and apparatus for the direct production of industrial lead oxide, wherein molten lead is fed into a reactor and is stirred with the addition of air and the resulting reaction product is drawn off.

Lead oxide is the starting material or the significant component of various chemical processes and has to satisfy a range of quality requirements which make the production thereof difficult. The basic reaction $Pb + \frac{1}{2}O_2 = PbO$ takes place relatively well at temperatures from 200° C. upwards. However, the degree of conversion of this reaction, by hitherto known methods, is so poor that for the manufacture of a product complying with the required quality, a pre-oxidation process in a first reactor has to be supplemented with a final oxidation in a second process step. Even the so-produced lead oxide is usually not ready for marketing due to its particle size distribution, and has to undergo sifting, grinding or sieving in a third process stage.

Thus a lead oxide complying with marketing demands with more than 99.7% PbO and a maximum particle size of 60 μm, has hitherto had to undergo a very complicated production, and such known methods are costly in connection with capital, energy and personnel requirements.

The method steps of pre-oxidation and final oxidation have undergone development improvements in various ways, and even the device used for the pre-oxidation, known as the Barton reactor, has been changed in order to increase the efficiency and production quality of the product; however a degree of oxidation of 99% in the manufactured product has practically never been exceeded. As disclosed in DE-AS No. 1,467,347 and U.S. Pat. No. 3,322,496, for example, by varying the lead input as well as the air input through introduction of air in the base part of the reaction vessel, by applying a baffle plate in front of the outlet for the reaction product, by interception of a cyclone separator and through back-feeding and further oxidation of the larger and heavier reaction product particles, content of metallic lead in the product under 4% by weight and preferably less than 2% by weight has been achieved. Individual values of samples taken during the process run occasionally exhibit a lead content by weight but under 1%, do not decrease the average value of the Pb content to below 1%. A product with 1% metallic lead content is, however, not acceptable in the most important fields of application such as glass, ceramics and stabilizer industries.

The following systems are known for the control of the reaction in the Barton reactor:
1.
   (a) Constant maintenance of the air volume sucked through the reactor,
   (b) infeed of the molten lead in small amounts depending on the temperature in the reactor.
2.
   (a) Even lead infeed over an average span,
   (b) air-control depending on the temperature in the reactor.

In both of these systems, the process runs automatically and on average, a uniform product is produced. This apparent uniformity disappears however, if several instantaneous samples are drawn during a cycle run and then analyzed. Depending on the degree of fluctuation of the reactor temperature, deviations from the average degree of oxidation are found which account for several percentage units. This has no serious effect in a two-stage process, due to the subsequent oxidizing of the product.

Such deviations however, are inadmissible if a practically fully oxidized product is to be produced. During a cycle run a fully oxidized product may be reached, but afterwards an insufficiently oxidized product could occur for a time, and the oxidation of the product would be insufficient.

SUMMARY OF THE INVENTION

The invention is based on the aim of providing a method and an apparatus with which it is possible to manufacture lead oxide in one stage, the product having the required degree of purity and of the required particle size.

According to the invention, this aim is accomplished in order to achieve a PbO content of well over 99%, preferably 99.7% to 99.8% by introducing the lead flow at a constant and even rate and maintaining the predetermined reaction temperature with a maximum fluctuation of ±5° C., the air flow being altered to a minimum degree.

Suprisingly, it has been shown that with this mode of action, the degree of fluctuation of the reaction conditions can be reduced to a minimum.

It is of specific advantage if the lead is injected directly into the reactor at a temperature $T_{Pb}$ which is close to the temperature of the reaction $T_R$ but is not more than 50° C. less. This means that the lead enters the reactor at a temperature not much under the process temperature.

The viscosity of molten lead decreases considerably with the temperature, so that the infed lead is split up and oxidized by the stirring means in the reactor more quickly and more fully, the hotter the temperature is. An infeeding of the lead through an inlet in the reactor, which also permits cold air flowing in, is common in conventional designs, can thus not be permitted. The metal must rather be injected in alone and at a sufficiently high temperature to give a complete reaction, wherein a spraying with heated compressed air is advantageous. Whereas the process temperature in the method described in the U.S. Pat. No. 3,322,496 is relatively low, it has proved advantageous to set the reaction temperature at over 500° C., preferably at 600° C., 640° C. at the most.

If all the parameters determining the oxidizing process, i.e. lead dosing and lead temperature, air dosing and process temperature, are co-ordinated, the reaction runs completely evenly and requires principally no more control than the compensation of small fluctuations which can occasionally result with individual parameters. Such a compensation can be carried out with a minimum alteration of the air through-put, wherein the controlling parameter is always the temperature in the reactor. This must not fluctuate more than ±5° C., preferably ±2° C., which is easily achieved if the above mentioned conditions are adhered to, and this temperature should be set between 480° and 640° C., preferably 600° C. Lower set temperatures lead to an incomplete reaction and higher temperatures lead to difficulties resulting from a sintering of the product. The lead dosing can be kept constant in the simplest of ways by the molten lead being fed into the reactor from a container or vessel via a nozzle in which the lead level is held constant. In this manner there is always a constant static pressure present above the nozzle, so that the infeed conditions of the lead are constant.

For carrying out the method, a supply vessel can be advantageously arranged above the reactor, out of which an exchangeable nozzle extends into the reaction space, and this supply vessel is connected to a melt container via a feed line and an overflow. In this embodiment, the feed line and the overflow provide in the simplest of ways for filling the supply vessel to a constant level and thus maintaining a constant static pressure of the molten lead.

In order to prevent a blockage of the nozzle, a controllable cleaning pin is advantageously arranged on the nozzle, with which the nozzle is cleaned from time to time.

It can also be advantageous if the nozzle is a known type spray nozzle, which is fed with heated compressed air via a line running through the melt container.

BRIEF DESCRIPTION OF THE DRAWINGS

Embodiments of the invention are explained in the following description with reference to the figures of the drawings, wherein.

DETAILED DESCRIPTION OF THE DRAWINGS

Figure 1:
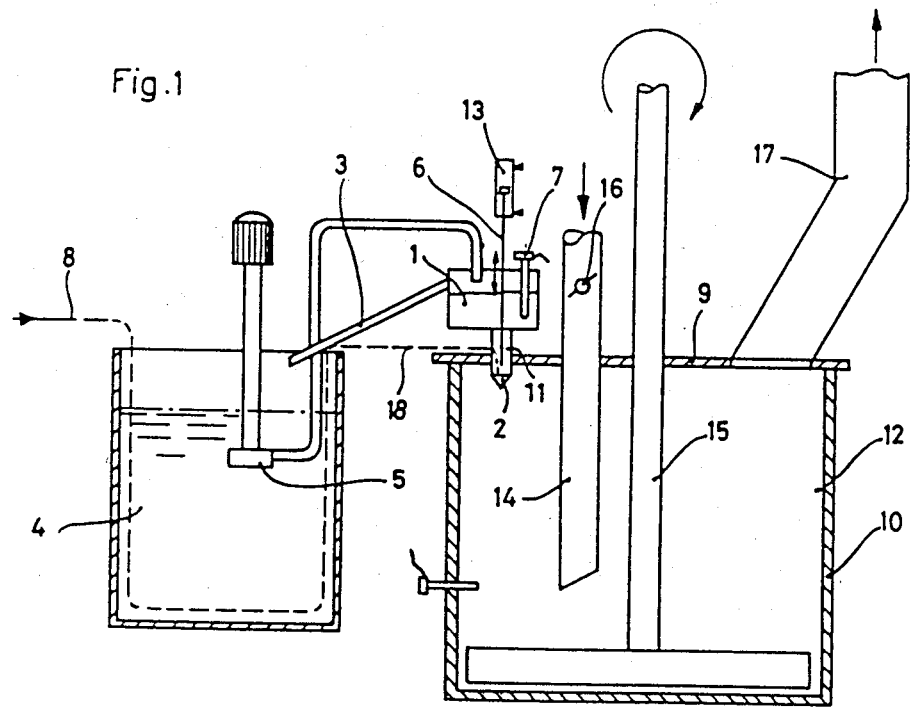
FIG. 1 is a schematic sectional view of a device for carrying out the method and FIG. 2 is a schematic top view of the device shown in FIG. 1.
Figure 2:
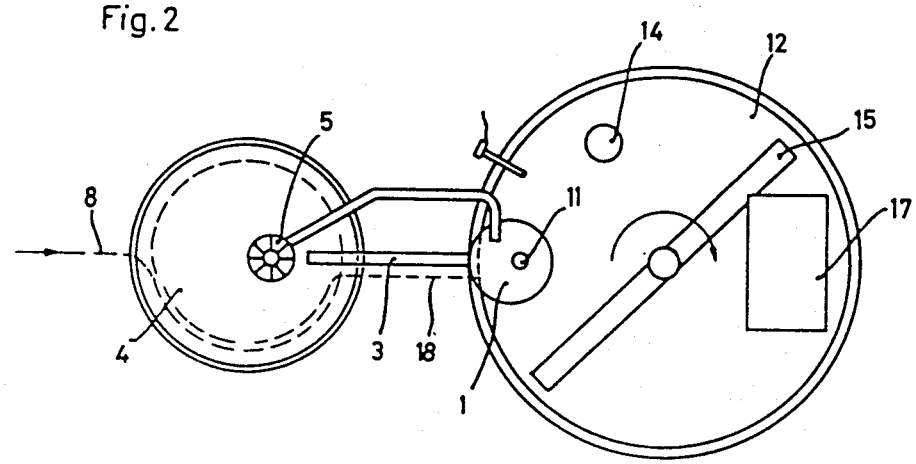

A supply vessel 1 for molten lead is arranged above the cover of a Barton reactor 10 close to the edge thereof, the base of said vessel having a cylindrical piece 11 which extends through a bore hole in the reactor cover into the reaction space. In this cylindrical piece 11, is situated an exchangeable nozzle 2 which has a precisely gaged bore hole for the lead outflow. The supply vessel 1 has, in addition to the mentioned lead outlet, a lead overflow 3 which leads back to a melt container 4. A submerged pump 5, in this melt container 4, constantly pumps a surplus of lead into the supply vessel, so that said vessel always remains filled to a constant level and the static pressure of the lead is kept constant by the nozzle 2. In order to prevent the nozzle 2 from becoming blocked with oxides, it is automatically passed through and cleaned at regular intervals by a steel pin 6 having the same diameter. This steel pin can be control-operated by a working cylinder. Using this device, a completely even lead dosing is achieved and the lead metting up with cooling air in the reactor 10 is prevented. The temperature of the injected lead can be precisely observed and regulated with a thermoelement 7. The air infeed takes place via the line 14 with the throttle 16, and a stirring means 15 stirs the molten lead.

A drawing off of the lead oxide takes place via the line 17 in a known manner.

The spraying of the lead with heated compressed air can be carried out in such a way that the nozzle in the cylindrical piece 11 is formed as a spray nozzle in a known manner and compressed air is lead through spiral tubes 8 arranged in the melt container, the air being heated and then lead into the nozzle, as schematically shown by 18.

The following example illustrates the invention.

EXAMPLE OF PERFORMANCE OF THE METHOD ACCORDING TO THE INVENTION

Molten lead in a rate of 420 kg/h was injected into a reactor of 1400 mm dia. at 550° C., wherein the temperature of the reaction was set at 600° C., the speed of the stirring means was 200 rpm. The oxide extracted in a cyclone and subsequent filter had, over a production period of three weeks, a maximum PbO content of 99.88%, whereas the minimum analysis was 99.75%. The average was at 99.80%. A part of 0.24% was found as sieve refuse over 60 $\mu$m.

The produced lead oxide was examined for its applicability in the majority of fields of application, and the results were all positive. In particular, excellent glasses and glazes could be melted and wet chemical lead pigments and lead salts made, as for example stabilizers for the plastics industry.

What we claim is:

1. A one-stage continuous method for the direct production of industrial lead oxide, wherein molten lead is continuously fed into a reactor and is stirred therein at a pre-determined reaction temperature greater than 500° C. up to 640° C., and the resulting reaction product is drawn off continuously, and wherein the product exhibits a PbO content of substantially more than 99%, comprising
    feeding the lead flow in a constant and even manner by introducing the molten lead into the reactor at a temperature close to and not more than 50° C. lower than the pre-determined reaction temperature, via a nozzle from a vessel in which the molten lead level is held constant, and
    maintaining the reaction temperature level within ±5° C. of the pre-determined reaction temperature, said reaction temperature level being maintained by maintaining a continuous flow of heated air to said reactor at a substantially constant rate and, when said temperature level varies, correcting said temperature by slightly varying only the air flow.

2. A method according to claim 1 wherein the temperature of the reaction is fixed at a value of approximately 600° C.

3. A method according to claim 1 wherein said product has a PbO content of 99.7–99.8% and a maximum particle size of 60 $\mu$m.

4. Method according to claim 1, wherein the pre-determined reaction is set at about 600° C.

* * * * *